Patented Feb. 1, 1949

2,460,692

UNITED STATES PATENT OFFICE 2,460,692

POLYMERIZATION OF RESIN OILS WITH MIXED CLAY AND ORGANIC ACID CATALYST

David F. Gould, Riverton, N. J., assignor to Allied Chemical & Dye Corporation, New York, N. Y., a corporation of New York No Drawing. Application June 24, 1943, Serial No. 492,121

6 Claims. (Cl. 260—81)

This invention relates to a new catalytic process for preparing resins by the polymerization of polymerizable materials of the coumarone-indene-styrene type.

The object of this invention is to provide a new process for the production of resins of the coumarone-indene-styrene type.

In accordance with this invention a resin oil, the polymerizable constituents of which consist chiefly of at least one compound selected from the group consisting of coumarone, indene, styrene and homologs thereof, is contacted with an unactivated adsorbent clay such as a bentonitic clay and an acid selected from the group consisting of formic acid and oxalic acid, whereby the polymerizable constituents are effectively polymerized to form resins of the coumarone-indene-styrene type. The bentonitic clay, which is typified by substances commonly known as bentonites, and fuller's earth are cheap and readily available; furthermore, the acids employed in conjunction with the clay, namely formic or oxalic acid, are also readily available. In addition, the resins produced in accordance with this invention are lighter in color than those obtained from the same oils employing the usual sulfuric acid polymerization catalyst. Hence, this invention provides a new and effective polymerization procedure for the production of valuable resins of the coumarone-indene-styrene type.

The resin oils which may be treated in accordance with this invention may be any resin oil, the polymerizable constituents of which consist predominantly of coumarone, indene, styrene or their homologs. Such oils may be obtained by fractionation of tars such as coal tar, water-gas tar, and oil-gas tar, or may be obtained from drip oil (the oil which settles out of gas-collecting systems and mains through which hydrocarbon gases such as coal-distillation gas or water gas flow), or from coke-oven distillates; fractions obtained from cracked and reformed petroleum distillates boiling within the range of 135° to 205° C. and containing polymerizable constituents of the above type may also be treated in accordance with this invention. The particular polymerizable constituents present in the oil employed will vary, depending on the boiling range thereof, its source, and the pretreatment, if any, to which it has been subjected.

Before subjecting the oil to treatment in accordance with my invention tar acids and tar bases, if any, should be removed therefrom, which may be accomplished by first subjecting the oil to an alkaline wash and then to an acid wash; for example, the oil may be washed with a 20% sodium hydroxide solution and thereafter treated with sulfuric acid of from 10% to 50%, e. g. 20%, concentration at a temperature of about 25° C. Preferably, cyclopentadiene constituents, i. e. cyclopentadiene and its homologs, dicyclopentadiene and its homologs, and addition products of cyclopentadiene with unsaturated compounds, are also removed from the oil prior to subjecting the oil to treatment with the catalyst of this invention. Such constituents may be removed by subjecting the oil to contact with dilute sulfuric acid, e. g. acid of about 50° to 60° Bé., followed by vacuum distillation of the oil from the residue; the cyclopentadiene constituents may also be removed by subjecting the oil to fractionation at atmospheric pressure to remove as distillate low-boiling color-forming bodies comprising cyclopentadiene, and then further fractionating the oil at low temperature, e. g. by a vacuum fractionation, to remove as residue high-boiling color-forming bodies comprising cyclopentadiene addition compounds, as disclosed and claimed in United States Patent 2,315,771, issued April 6, 1943 to Edwin L. Cline.

Polymerization of the oil from which tar acids, tar bases and cyclopentadiene constituents have been removed may be effected by contacting the oil at a temperature between about 80° and about 120° C., preferably between about 90° and about 110° C., and in the absence of air and moisture, with the catalytic material of this invention. The bentonitic clays employed in accordance with this invention are characterized by an alumina content which may vary between about 12% and about 27% and a silica content which may vary between about 54% and about 63% of the weight of the clay. The catalytic material is preferably prepared by adding the desired amounts of dry clay and acid directly to the oil; however, the catalyst may also be manufactured prior to addition to the resinogenic oil by impregnating the clay with an aqueous solution of formic or oxalic acid and drying. The amount of clay employed should not be greater than 15%, preferably between about 10% and about 15%, of the weight of the oil, and the amount of acid should not be more than 4%, preferably between about 1% and about 2%, of the weight of the oil. Contact of the oil with the catalyst may be effected by agitating a mixture of clay, acid and oil, or by flowing the oil through a bed of the catalyst. Preferably, the polymerization is carried out under substantially anhydrous conditions which may be maintained by blowing carbon dioxide through the mixture undergoing polymerization. The oil may be maintained in contact with the catalyst for not more than about six hours, preferably between about four and about six hours, in order to effect substantially complete polymerization. At the end of this time the clay may be removed by simple filtration and the resin recovered by distillation. The resin recovered is in all cases lighter in color than the resin which would be obtained from the same oil using a sulfuric acid polymerization catalyst.

My work on this subject has shown that the bentonitic clay by itself is not an effective polymerization agent since in the absence of the formic or oxalic acid this type of clay resinifies only about 14% of the available polymerizable constituents of a purified drip-oil "Hi-flash" naphtha at 100° C.; furthermore, the acids themselves are not satisfactory polymerization agents. Accordingly, it is most surprising that the combination of these ingredients effects the polymerization of the polymerizable constituents of the oil in the manner described.

I have also found that the addition of formic or oxalic acid to unactivated adsorbent clays other than bentonitic clays produces effective catalysts for polymerization of the polymerizable constituents of oils of the character above described. Thus, the combination of one of these acids with fuller's earth produces a highly effective catalyst. By the term "unactivated adsorbent clays" I intend to refer to clays such as bentonite and fuller's earth employed for bleaching, clarification, etc. but which in their unactivated state are not effective polymerization catalysts. As is known, the bentonitic clays and fuller's earth preferably employed in accordance with my invention are sodium and calcium derivatives, respectively, of montmorillonite.

The following examples are illustrative of my invention. Amounts are given in parts by weight.

*Example 1.*—A crude drip-oil "Hi-flash" naphtha having a boiling range between 165° and 205° C., from which tar acids and tar bases had been removed, was stirred with 3% by volume of 50° Bé. sulfuric acid at room temperature for one hour; at the end of this time the mixture was permitted to settle and the acid layer was separated from the oil and the oil neutralized with aqueous sodium hydroxide. The treated oil was then redistilled at an absolute pressure of one inch of mercury, whereby a purified oil was obtained free of cyclopentadiene constituents and containing 48.5% polymerizable constituents comprising chiefly indene and styrene homologs, e. g. methylstyrene, in the ratio of about 3 to 2.

200 parts of the purified oil, 4 parts of 60% formic acid and 20 parts of bentonite were placed in a vessel provided with a reflux condenser, the temperature raised to 100° C. and maintained at this point for about four hours, the mixture being agitated by passing carbon dioxide gas therethrough. At the end of this time the mixture was permitted to cool, the oil was filtered to separate the clay, neutralized with sodium hydroxide and washed with water. The oil was then distilled to recover the resin, whereby a product having a melting point of 134.5° C. and a color of C-2, accounting for about 63.5% of the available resin-forming constituents, was obtained. Use of sulfuric acid as the polymerization catalyst gave a much darker resin of color C-11.

*Example 2.*—200 parts of purified crude drip-oil "Hi-flash" naphtha produced as described in Example 1, 1 part of 60% formic acid and 12 parts of fuller's earth were placed in a vessel provided with a reflux condenser, the temperature raised to 100° C. and maintained at approximately this value for about four hours, the mixture being agitated by passing carbon dioxide gas therethrough. At the end of this time the mixture was permitted to cool, the oil was filtered to separate the clay, neutralized with sodium hydroxide and washed with water. The oil was then distilled to recover the resin, whereby a product having a melting point of 88° C. and a color of C-3 was recovered. Use of sulfuric acid as the polymerization catalyst gave a much darker resin of color C-6.

*Example 3.*—200 parts of purified oil produced as described in Example 1, 4 parts of oxalic acid and 20 parts of bentonite were placed in a vessel provided with a reflux condenser, the temperature raised to 100° C. and maintained at this point for about four hours, the mixture being agitated by passing carbon dioxide gas therethrough. At the end of this time the mixture was permitted to cool, the oil was filtered to separate the clay, neutralized with sodium hydroxide and washed with water. The oil was then distilled to recover the resin, whereby a product having a melting point of 120.2° C. and a color of C-2½ was obtained. Use of sulfuric acid as the polymerization catalyst gave a much darker resin of color C-11.

The resin scale hereinabove used is the customary resin color scale, which scale is made by mixing three stock solutions in the proportions indicated in the following table, thereby obtaining the colors indicated in this table; namely, stock solution A constituted of 40 cc. of 33.5% hydrochloric acid and 1560 cc. of water; stock solution B made by triturating 450 grams of C. P. ferric chloride ($FeCl_3.6H_2O$), 270 cc. of solution A and filtering, using the clear filtrate for stock solution B; and stock solution C made by triturating 60 grams of C. P. cobalt chloride ($CoCl_2.6H_2O$) and 60 cc. of solution A and filtering, using the filtrate for stock solution C.

*Volumes in cubic centimeters*

| Color Number | A | B | C | Water | Standard C Series |
|---|---|---|---|---|---|
| C-1/16 | 21 | | | | 3 of #½. |
| C-1/8 | 18 | | | | 6 of #½. |
| C-1/4 | 12 | | | | 12 of #½. |
| C-3/8 | 6 | | | | 18 of #½. |
| C-1/2 | 125 | 0.5 | 0.50 | | |
| C-3/4 | | | | | 12 of #½ plus 12 of #1. |
| C-1 | 125 | 1.0 | 0.75 | | |
| C-1¼ | | | | | 12 of #1 plus 12 of #1½. |
| C-1½ | 125 | 1.4 | 0.95 | | |
| C-2 | 125 | 2.0 | 1.25 | | |
| C-2½ | 125 | 2.8 | 1.60 | | |
| C-3 | 125 | 4.0 | 2.00 | | |
| C-3½ | 15 | 6.0 | 2.00 | 110 | |
| C-4 | 15 | 8.0 | 2.00 | 110 | |
| C-5 | 15 | 10.0 | 2.75 | 85 | |
| C-6 | 10 | 20.0 | 5.0 | 90 | |
| C-7 | | 40.0 | 7.5 | 100 | |
| C-8 | | 65.0 | 5.0 | 50 | |
| C-9 | | 125.0 | 10.0 | 27.5 | |
| C-10 | | 125.0 | 10.0 | | |

The solutions should be mixed well and about 25–28 cc. of each of the above indicated mixtures placed in a 1 oz. test bottle, each bottle labeled with its number, and the bottle sealed with sealing wax to prevent evaporation of water and HCl.

To determine the color of a resin, a 2-gram sample thereof is dissolved in 25 cc. of benzol and depth of the color of the resin solution thus produced is compared with the standard colors. If the sample lies between two consecutive numbers, its color is reported as the higher one.

For resins having a color darker than C–10, 1 cc. of the benzene test solution prepared as above described is diluted with 25 cc. of pure benzene, the color of the diluted sample determined in accordance with the above table and the color of the resin then reported as the number of the diluted sample plus 10; thus, if the diluted sample reads C–1, the color of the resin would be reported as C–11.

Since certain changes may be made in carrying out the above process without departing from the scope of the invention, it is intended that all matter contained in the above description shall be interpreted as illustrative and not in a limiting sense.

I claim:

1. A process for producing resins from resin oils selected from the group consisting of oils obtained from coal tar, water-gas tar, oil-gas tar, drip oil, coke-oven distillates and cracked and reformed petroleum distillates, the polymerizable constituents of which consist predominantly of at least one of the compounds selected from the group consisting of coumarone, indene, styrene, and their homologs, which comprises contacting the oil with an effective amount up to 15% of an unactivated adsorbent clay, containing between 12% and 27% alumina and between 54% and 63% silica, and an effective amount up to 4% of an acid selected from the group consisting of formic and oxalic acids based on the weight of the oil at a temperature between 80° and 120° C.

2. A process for producing resins from resin oils selected from the group consisting of oils obtained from coal tar, water-gas tar, oil-gas tar, drip oil, coke-oven distillates and cracked and reformed petroleum distillates, the polymerizable constituents of which consist predominantly of at least one of the compounds selected from the group consisting of coumarone, indene, styrene, and their homologs and from which tar acids, tar bases and cyclopentadiene constituents have been removed, which comprises contacting the oil with between 10% and 15% of an unactivated adsorbent clay containing between 12% and 27% alumina and between 54% and 63% silica, and between 1% and 2% of an acid selected from the group consisting of formic and oxalic acids based on the weight of the oil at a temperature between 80° and 120° C.

3. A process for producing resins from resin oils selected from the group consisting of oils obtained from coal tar, water-gas tar, oil-gas tar, drip oil, coke-oven distillates and cracked and reformed petroleum distillates, the polymerizable constituents of which consist predominantly of at least one of the compounds selected from the group consisting of coumarone, indene, styrene, and their homologs and from which tar acids, tar bases and cyclopentadiene constituents have been removed, which comprises contacting the oil with an effective amount up to 15% of bentonite and an effective amount up to 4% of an acid selected from the group consisting of formic and oxalic acids based on the weight of the oil at a temperature between 80° and 120° C. and for a time up to 6 hours.

4. A process for producing resins from resin oils selected from the group consisting of oils obtained from coal tar, water-gas tar, oil-gas tar, drip oil, coke oven distillates and cracked and reformed petroleum distillates, the polymerizable constituents of which consist predominantly of at least one of the compounds selected from the group consisting of coumarone, indene, styrene, and their homologs and from which tar acids, tar bases, and cyclopentadiene constituents have been removed, which comprises contacting the oil with an effective amount up to 15% of fuller's earth and an effective amount up to 4% of an acid selected from the group consisting of formic and oxalic acids based on the weight of the oil at a temperature between 80° and 120° C. and for a time up to 6 hours.

5. A process for producing resins from resin oils selected from the group consisting of oils obtained from coal tar, water-gas tar, oil-gas tar, drip oil, coke-oven distillates and cracked and reformed petroleum distillates, the polymerizable constituents of which consist predominantly of at least one of the compounds selected from the group consisting of coumarone, indene, styrene, and their homologs and from which tar acids, tar bases and cyclopentadiene constituents have been removed, which comprises contacting the oil with between 10% and 15% of bentonite and between 1% and 2% of formic acid based on the weight of the oil at a temperature between 90° and 110° C. and for a time between 4 and 6 hours.

6. A process for producing resins from resin oils selected from the group consisting of oils obtained from coal tar, water-gas tar, oil-gas tar, drip oil, coke-oven distillates and cracked and reformed petroleum distillates, the polymerizable constituents of which consist predominantly of at least one of the compounds selected from the group consisting of coumarone, indene, styrene, and their homologs and from which tar acids, tar bases and cyclopentadiene constituents have been removed, which comprises contacting the oil with between 10% and 15% of fuller's earth and between 1% and 2% of formic acid based on the weight of the oil at a temperature between 90° and 110° C. and for a time between 4 and 6 hours.

DAVID F. GOULD.

REFERENCES CITED

The following references are of record in the file of this patent:

UNITED STATES PATENTS

| Number | Name | Date |
|---|---|---|
| 2,092,998 | Anderson | Sept. 14, 1937 |
| 2,160,537 | Carmody | May 30, 1939 |
| 2,227,808 | Driesbach | Jan. 7, 1941 |
| 2,330,685 | Connolly | Sept. 28, 1943 |

OTHER REFERENCES

Bentonite—Tech. Bulletin Data No. 202, page 1 (received May 18, 1939) of American Colloid Co.

Certificate of Correction

Patent No. 2,460,692.

February 1, 1949.

DAVID F. GOULD

It is hereby certified that error appears in the printed specification of the above numbered patent requiring correction as follows:

Column 1, line 14, after the word "clay" insert *or fuller's earth*;

and that the said Letters Patent should be read with this correction therein that the same may conform to the record of the case in the Patent Office.

Signed and sealed this 28th day of June, A. D. 1949.

[SEAL]

THOMAS F. MURPHY,
*Assistant Commissioner of Patents.*